US010834019B2

(12) United States Patent
Dunne et al.

(10) Patent No.: US 10,834,019 B2
(45) Date of Patent: *Nov. 10, 2020

(54) INCREASED NETWORK RESOURCES IN EXCHANGE FOR SHARING OF DEVICE RESOURCES

(71) Applicants: International Business Machines Corporation, Armonk, NY (US); National University of Ireland Maynooth, Maynooth (IE)

(72) Inventors: Jonathan Dunne, Dungarvan (IE); Paul B. French, Cork (IE); James P. Galvin, Jr., Georgetown, KY (US); David W. Malone, Dublin (IE); Patrick J. O'Sullivan, Ballsbridge (IE)

(73) Assignees: INTERNATIONAL BUSINESS MACHINES CORPORATION, Armonk, NY (US); NATIONAL UNIVERSITY OF IRELAND, Maynooth (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/374,076

(22) Filed: Apr. 3, 2019

(65) Prior Publication Data
US 2019/0230045 A1    Jul. 25, 2019

Related U.S. Application Data

(63) Continuation of application No. 16/132,469, filed on Sep. 17, 2018, now Pat. No. 10,284,491, and a
(Continued)

(51) Int. Cl.
*H04L 12/911* (2013.01)
*H04L 12/26* (2006.01)
(Continued)

(52) U.S. Cl.
CPC ............. *H04L 47/783* (2013.01); *G06F 9/00* (2013.01); *G06F 9/46* (2013.01); *G06F 11/3024* (2013.01);
(Continued)

(58) Field of Classification Search
CPC ..... H04L 47/783; H04L 43/0817; G06F 9/00; G06F 9/46; G06F 11/3024
(Continued)

(56) References Cited

U.S. PATENT DOCUMENTS 5,560,021 A    9/1996  Vook
6,463,457 B1   10/2002 Armentrout
(Continued)

FOREIGN PATENT DOCUMENTS

WO    2009055573 A1    4/2009
WO    2013173308 A1   11/2013

OTHER PUBLICATIONS

"Boingo Media—WiFi Sponsorship & Advertising," [online] Boingo Wireless, Inc. © 2013 [retrieved Apr. 1, 2014] retrieved from the Internet: <http://media.boingo.com/>, 4 pg.
(Continued)

*Primary Examiner* — Meng Vang
(74) *Attorney, Agent, or Firm* — Cuenot, Forsythe & Kim, LLC

(57) ABSTRACT

An indicator can be received from a client device. The indicator can indicate an agreement by a user of the client device to share device resources of the client device with an entity distinct from the client device and distinct from the user of the client device. Responsive to receiving from the mobile device the indicator, and responsive to receiving a message from a sharing agent of the mobile device indicating that that no user inputs are received by the mobile device over a particular duration of time and that video content is
(Continued)

not being streamed to the mobile device, a client access agent can access the shared resources, data to be processed by the shared device resources can be communicated to the mobile device, and a level of a quality of service provided by a communication network to the mobile device can be increased.

20 Claims, 4 Drawing Sheets

Related U.S. Application Data continuation of application No. 16/129,806, filed on Sep. 13, 2018, now Pat. No. 10,284,490, which is a continuation of application No. 14/625,831, filed on Feb. 19, 2015, now Pat. No. 10,079,775, and a continuation of application No. 14/328,122, filed on Jul. 10, 2014, now Pat. No. 10,091,131, and a continuation of application No. 14/328,122, filed on Jul. 10, 2014, now Pat. No. 10,091,131.

(51) Int. Cl.
| | | |
|---|---|---|
| *H04M 15/00* | (2006.01) | |
| *G06F 11/30* | (2006.01) | |
| *H04L 29/08* | (2006.01) | |
| *H04L 29/06* | (2006.01) | |
| *G06F 9/00* | (2006.01) | |
| *G06F 9/46* | (2006.01) | |
| *H04L 12/24* | (2006.01) | |
| *H04L 12/14* | (2006.01) | |

(52) U.S. Cl.
CPC ...... *G06F 11/3037* (2013.01); *H04L 43/0817* (2013.01); *H04L 67/1095* (2013.01); *H04L 67/42* (2013.01); *H04M 15/765* (2013.01); *H04M 15/7652* (2013.01); *H04M 15/78* (2013.01); *H04M 15/781* (2013.01); *H04M 15/8083* (2013.01); *H04M 15/8214* (2013.01); *H04L 12/1435* (2013.01); *H04L 41/0893* (2013.01); *H04L 41/5019* (2013.01); *H04L 41/5029* (2013.01); *H04L 43/0888* (2013.01)

(58) Field of Classification Search
USPC ....................................................... 709/203
See application file for complete search history.

(56) References Cited

U.S. PATENT DOCUMENTS

| | | |
|---|---|---|
| 7,054,790 B1 | 5/2006 | Rich |
| 8,352,980 B2 | 1/2013 | Howcroft |
| 8,495,648 B1 | 7/2013 | Brandwine |
| 10,079,775 B2 | 9/2018 | Dunne et al. |
| 10,091,131 B2 | 10/2018 | Dunne et al. |
| 10,284,490 B2 | 5/2019 | Dunne et al. |
| 10,284,491 B2 | 5/2019 | Dunne et al. |
| 2002/0073013 A1 | 6/2002 | Haddad |
| 2004/0019890 A1 | 1/2004 | Verbeke |
| 2006/0117038 A1* | 6/2006 | Toebes ............... H04L 67/1021 |
| 2007/0240161 A1 | 10/2007 | Prabhakar |
| 2009/0282093 A1* | 11/2009 | Allard .................. G06Q 30/02 709/203 |
| 2009/0327164 A1 | 12/2009 | Saito |
| 2010/0281095 A1 | 11/2010 | Wehner |
| 2011/0235592 A1 | 9/2011 | Hoefel |
| 2012/0173305 A1 | 7/2012 | Bhaskaran |
| 2014/0003297 A1 | 1/2014 | Uusitalo |
| 2014/0004952 A1 | 1/2014 | Kern |
| 2014/0067527 A1 | 3/2014 | Schussel |
| 2016/0014040 A1 | 1/2016 | Dunne et al. |
| 2016/0014199 A1 | 1/2016 | Dunne et al. |
| 2019/0014057 A1 | 1/2019 | Dunne et al. |
| 2019/0020595 A1 | 1/2019 | Dunne et al. |

OTHER PUBLICATIONS

Nelson M.G., "Ad-Supported Wi-Fi Network Launches," [online] Incisive Interactive Marketing, LLC, Nov. 6, 2007, [retrieved Jul. 10, 2014] retrieved from the Internet: <http://www.clickz.com/print_article/news/1711332/ad-supported-wi-fi-network-launches>, 1 pg.
IBM: List of IBM Patents or Patent Applications Treated as Related, 2 pg.
Dunne, J. et al., "Increased Network Resources in Exchange for Sharing of Device Resources ", U.S. Appl. No. 14/328,122, filed Jul. 10, 2014, 31 pages (A copy is not provided as this application is available to the Examiner.).
Dunne, J. et al., "Increased Network Resources in Exchange for Sharing of Device Resources ", U.S. Appl. No. 14/625,831, filed Feb. 19, 2015, 31 pages (A copy is not provided as this application is available to the Examiner.).
Dunne, J. et al., "Increased Network Resources in Exchange for Sharing of Device Resources ", U.S. Appl. No. 16/132,469, filed Sep. 17, 2018, 31 pages (A copy is not provided as this application is available to the Examiner.).
Dunne, J. et al., "Increased Network Resources in Exchange for Sharing of Device Resources ", U.S. Appl. No. 16/129,806, filed Sep. 13, 2018, 31 pages (A copy is not provided as this application is available to the Examiner.).

\* cited by examiner

600

Receive from a client device an indicator indicating an agreement by a user of the client device to share device resources of the client device with an entity distinct from the client device and distinct form the user of the client device
605

Responsive to receiving from the client device the indicator indicating the agreement of the user of the of the client device to share the device resources of the client device with the entity, increase, using a processor, at least one network resource provided to the client device
610

FIG. 6

INCREASED NETWORK RESOURCES IN EXCHANGE FOR SHARING OF DEVICE RESOURCES

BACKGROUND

The present invention relates to communication networks, and more specifically, to use of communication network resources.

Users typically access the Internet via communication networks connected to the Internet. Access to such networks is provided either as a paid-for service (e.g., home broadband, cellular services, leased lines, etc.), or as a courtesy service (e.g. Wi-Fi at hotels, libraries, Airports, etc.). The amount of network bandwidth provided by communication networks to individual users usually is limited. For example, a user may have a billing arrangement with a network provider in exchange a particular amount of network bandwidth, or a courtesy service may limit the amount of network bandwidth provided to each individual user using the courtesy service.

SUMMARY

A method includes communicating to a mobile device a menu of client device sharing options, the menu including a plurality of menu items each indicating a particular level of device resources of the mobile device and a corresponding level of network resources to be provided to the mobile device in exchange for the mobile device sharing the particular level of the device resources. The method also can include receiving from the mobile device an indicator, the indicator indicating an agreement by a user of the mobile device to share device resources of the mobile device with an entity distinct from the mobile device and distinct from the user of the mobile device, and a selection, by the user of the mobile device, of at least one of the menu items. The method also can include, responsive to receiving from the mobile device the indicator indicating the agreement of the user of the of the mobile device to share the device resources of the mobile device with the entity and responsive to receiving a message from a sharing agent of the mobile device indicating that that no user inputs are received by the mobile device over a particular duration of time and that video content is not being streamed to the mobile device, accessing, by a client access agent executed by a first processor, the shared device resources, communicating to the mobile device data to be processed by the shared device resources of the mobile device, the shared device resources processing the data, and increasing a level of quality of service provided by the communication network to the mobile device to be higher than a present level of quality of service being provided to the mobile device.

A system includes a first processor programmed to initiate executable operations. The executable operations include communicating to a mobile device a menu of client device sharing options, the menu including a plurality of menu items each indicating a particular level of device resources of the mobile device and a corresponding level of network resources to be provided to the mobile device in exchange for the mobile device sharing the particular level of the device resources. The executable operations also can include receiving from the mobile device an indicator, the indicator indicating an agreement by a user of the mobile device to share device resources of the mobile device with an entity distinct from the mobile device and distinct from the user of the mobile device, and a selection, by the user of the mobile device, of at least one of the menu items. The executable operations also can include, responsive to receiving from the mobile device the indicator indicating the agreement of the user of the of the mobile device to share the device resources of the mobile device with the entity and responsive to receiving a message from a sharing agent of the mobile device indicating that that no user inputs are received by the mobile device over a particular duration of time and that video content is not being streamed to the mobile device, accessing, by a client access agent executed by the first processor, the shared device resources, communicating to the mobile device data to be processed by the shared device resources of the mobile device, the shared device resources processing the data, and increasing a level of quality of service provided by the communication network to the mobile device to be higher than a present level of quality of service being provided to the mobile device.

A computer program includes a computer readable storage medium having program code stored thereon. The program code is executable by a first processor to perform a method. The method includes communicating to a mobile device a menu of client device sharing options, the menu including a plurality of menu items each indicating a particular level of device resources of the mobile device and a corresponding level of network resources to be provided to the mobile device in exchange for the mobile device sharing the particular level of the device resources. The method also can include receiving from the mobile device an indicator, the indicator indicating an agreement by a user of the mobile device to share device resources of the mobile device with an entity distinct from the mobile device and distinct from the user of the mobile device, and a selection, by the user of the mobile device, of at least one of the menu items. The method also can include, responsive to receiving from the mobile device the indicator indicating the agreement of the user of the of the mobile device to share the device resources of the mobile device with the entity and responsive to receiving a message from a sharing agent of the mobile device indicating that that no user inputs are received by the mobile device over a particular duration of time and that video content is not being streamed to the mobile device, accessing, by a client access agent executed by the first processor, the shared device resources, communicating to the mobile device data to be processed by the shared device resources of the mobile device, the shared device resources processing the data, and increasing a level of quality of service provided by the communication network to the mobile device to be higher than a present level of quality of service being provided to the mobile device.

BRIEF DESCRIPTION OF THE SEVERAL VIEWS OF THE DRAWINGS

FIG. 6 is a flow chart illustrating an example of a method of increasing a communication network resource provided to a client device.

DETAILED DESCRIPTION

Figure 1:
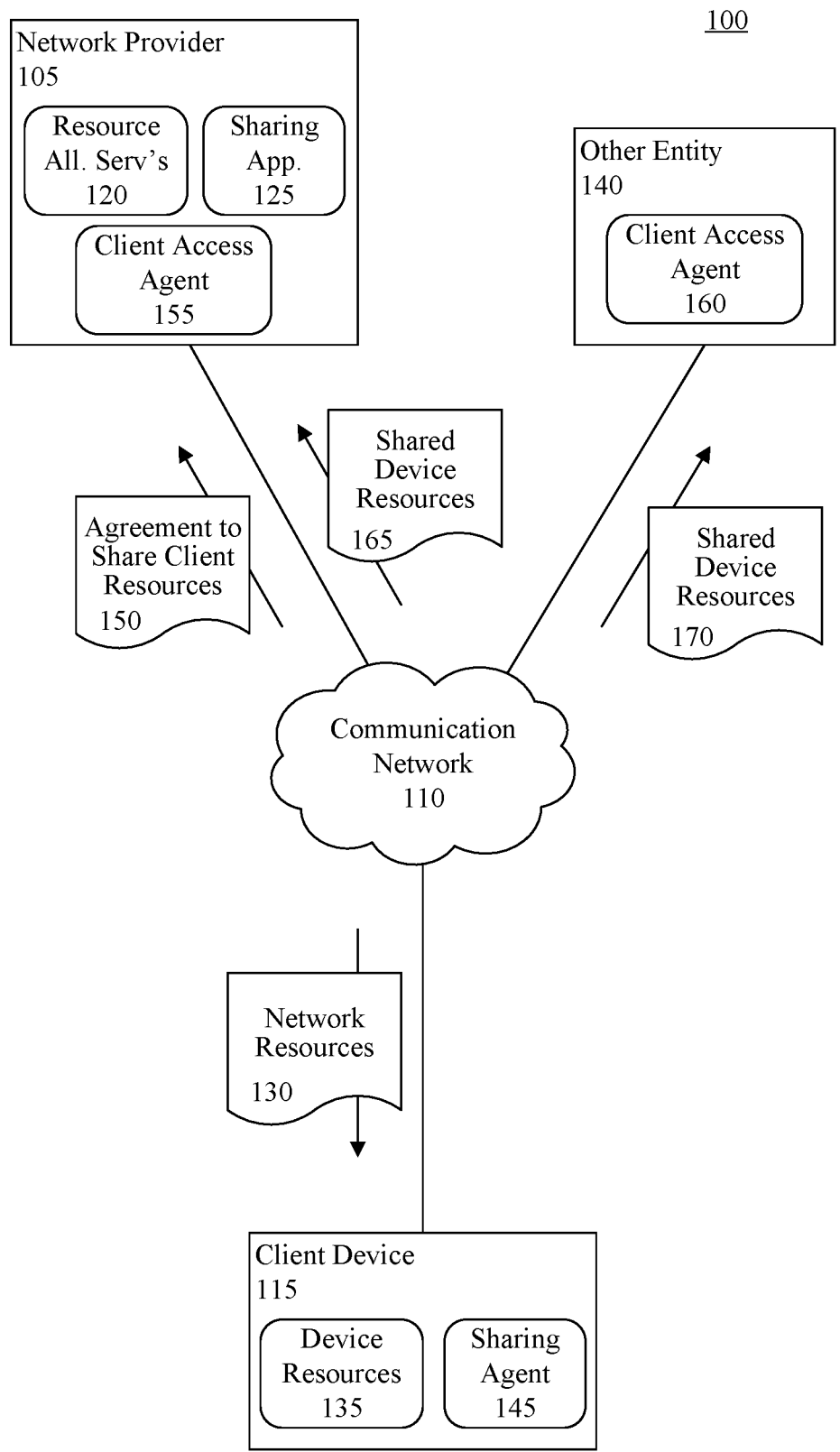
FIG. 1 is a block diagram illustrating an example of a communication system.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to communication networks, and more specifically, to use of network resources. In accordance with the inventive arrangements disclosed herein, a user of a client device can agree to share resources of the client device with one or more other entities. In response, a network provider can increase one or more of the network resources provided to the client device. For example, a user can agree to share processor and/or memory resources of the client device with the other entity. In response, the network provider can provide to the user a higher level of quality of service (QoS) (e.g., additional bandwidth, reduced latency, reduced jitter, and the like), a higher level of, free or reduced pricing for access to certain applications/services, etc.

Several definitions that apply throughout this document now will be presented.

As defined herein, the term "client device" means a device including at least one processor that accesses a service available by remote processing system via a communication network. Examples of a client device include, but are not limited to, a workstation, a desktop computer, a mobile computer, a laptop computer, a netbook computer, a tablet computer, a smart phone, a personal digital assistant (PDA), and the like.

As defined herein, the term "device resource" means a hardware, software and/or data resource provided by a client device. Examples of a device resource include, but are not limited to, a processor of the client device, physical memory elements of the client device, software executed by the client device, data generated by the client device, and the like.

As defined herein, the term "network resource" means a resource provided by a communication network to one or more client devices. Examples of a network resource include, but are not limited to, a quality of service provided by a communication network, access to a particular application and/or service via a communication network, use of a computer readable storage medium via the communication network, and the like.

As defined herein, the term "quality of service" means a level of communication service provided to a client device. Such a level of communication service may include a level of bandwidth, a level of latency, a level of jitter, and/or the like. The level quality of service can be controlled by adjusting the level of bandwidth provided, adjusting the availability of communication channels, by provisioning specific resources such as tones or time slots, through traffic shaping, and the like.

As used herein, the term "QoS" is an acronym for the term "quality of service."

As defined herein, the term "network provider" means a provider of network resources to client devices. For example, a network provider can manage a communication network accessed by client devices.

As used herein, the term "primary network" means a communication network primarily used by a client device. For example, if a client device commonly is used to connect to a communication network providing communication services to a home of a user of the client device, such communication network is a primary network. Similarly, if a client device commonly is used to connect to a communication network providing communication services to a place of employment of a user of the client device, such communication network is a primary network. A communication network provided in a public establishment, such as a cafe, restaurant, library, hotel, airport, arena, stadium or the like is not a primary network unless such public establishment is a place of employment of a user of a client device connecting to such communication network.

As defined herein, the term "share" means to allow use of a device resource by an entity distinct from the client device and distinct from a user directly interacting with the client device via a user interface of the client device, wherein use of the device resource by the entity is independent of information presented by the client device to a user directly interacting with the user interface of the client device. In the context of the arrangements described herein, presenting information on the client device generated by an entity distinct from the client device, such as an advertisement, does not mean to "share" a device resource. The communication, from a client device to an entity who is not a user directly interacting with the user interface of the client device, of user responses to information that is presented is sharing of a device resource in the context of the arrangements described herein, however.

As defined herein, the term "entity" means something that exists external to a particular client device and that is not a user who directly interacts with the particular client device via a user interface of the client device. Examples of an entity include, but are not limited to, a network provider, an organization, a user who does not directly interact with the particular client device via a user interface of the client device, and the like.

As defined herein, the term "agreement" means an allowance for a course of action to take place.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

As defined herein, the term "user" means a person (i.e., a human being).

FIG. 1 is a block diagram illustrating an example of a communication system 100. The communication system 100 can include a network provider 105 that manages a communication network 110. In this regard, the network provider 105 can include one or more processing systems (e.g., servers), each including at least one processor, used by the network provider 105 to manage the communication network 110. The communication network 110 is a medium used to provide communications links between various devices and data processing systems connected together within the communication system 100. The communication network 110 may include connections, such as wire, wireless communication links and/or fiber optic cables. The communication network 110 can utilize and/or include any of a variety of different communication technologies such as a wide area network (WAN), a local area network (LAN), a wireless network, a mobile network, a Virtual Private Network (VPN), or the like. Various nodes of the communication network 110 can be communicatively linked to the Internet, the Public Switched Telephone Network (PSTN), or the like.

The network provider 105 can provide to client devices, such as a client device 115, access to the communication network 110. The client device 115 may use the communication network 110 to access the Internet, the PSTN, or the like. In illustration, via the communication network 110, the client device 115 may access websites, access e-mail, access instant messaging services, access online services, establish VPN connections, etc.

One or more processing systems of the network provider 105 can host resource allocation services 120. The resource allocation services 120 can manage allocation of network resources 130 of the communication network 110 to client devices, such as the client device 115. For example, the resource allocation services 120 can manage the level of QoS allocation to the client device 115, manage access to particular applications and/or services via a communication network 110 by the client device 115, manage use of network provided computer readable storage mediums by the client device 115, and the like.

One or more processing systems of the network provider 105 also can host a sharing application 125. The sharing application 125 can be configured to interface with the resource allocation services 120 to determine the level of network resources 130 to be provided to the client device 115. In illustration, if a user of the client device 115 agrees to share one or more device resources 135 of the client device 115 with an entity, such as the network provider 105 or another entity 140, the sharing application 125 can interface with the resource allocation services 120 to increase the network resources 130 provided to the client device 115. For example, QoS can be increased, access can be provided to one or more applications and/or services, and the like. In one aspect, the level of network resources 130 provided to the client device can be based on the level of device resources 135 shared by the client device.

The client device 115 can include a sharing agent 145 configured to manage sharing of the device resources 135 with the network provider 105 or other entity 140. For example, the sharing agent 145 can receive from the sharing application 125 a menu of client device sharing options, and present the menu to a user of the client device 115 via the client device's user interface. As will be further described, various sharing options can be presented, and for each sharing option, a particular level of network resources 130 can be indicated. The user can select one or more of the sharing options, agreeing to share certain device resources 135.

In response, the sharing agent 145 can configure the selected device resources 135 to be shared. For example, the sharing agent 145 can reserve one or more cores of the client device's processor for sharing, reserve a portion of processor cycles for sharing, reserve a portion of memory (e.g., random access memory (RAM) and/or a bulk storage device) for sharing, reserve use of an application or service for sharing, request information to be shared, etc. Further, the sharing agent 145 can communicate an agreement 150 to share selected device resources 135 to the sharing application 125. The agreement 150 can indicate which device resources 135 the user has selected to share.

In response to receiving the agreement 150, the sharing application 125 can interface with the resource allocation services 120 to increase the network resources 130 provided to the client device 115. Further, the sharing application 125 can indicate to a client access agent 155 of the network provider, and/or to a client access agent 160 of the other entity 140, which of the device resources 135 are available for use by the agent(s) 155, 160. The sharing application 125 also can indicate to the agent(s) 155, 160 an address of the client device 115, such as an Internet Protocol (IP) address, a media access control (MAC) address of the client device 115, a uniform resource identifier (URI), such as uniform resource locator (URL), associated with the client device 115, or the like.

The client access agent(s) 155, 160 can access the device resources 135 that are shared. For example, if the sharing application 125 indicates that a certain portion 165 of the device resources 135 are shared with the client access agent 155, the client access agent 155 can access that portion 165 of the shared device resources. Similarly, if the sharing application 125 indicates that a certain portion 170 of the device resources 135 are shared with the client access agent 160, the client access agent 160 can access that portion 170 of the shared device resources. It should be noted that the device resources 135 that are reserved for sharing can be shared with one or more client access agents 155, 160, and the present arrangements are not limited in this regard.

To access the shared device resources 165, 170, the client access agents 155, 160 can communicate to the sharing agent 145 requests to use such resources, and provide data for such use. In illustration, if the client access agent 160 is to use processor cycles on the client device 115, the client access agent 160 can communicate to the client device 115 data to be processed with those processing cycles. In one arrangement, the client access agent 160 also can communicate to the client device 115 program code, such as an application, service or plugin, to be executed by the processor to process the data. In another arrangement, the data can be processed by program code already resident on the client device 115. The sharing agent can communicate back to the client access agent 160 data output by processing the data. In addition to using the client device 115 to process data, the client access agent 160 can use many other client devices to process data. Thus, the client access agent 160 can leverage countless client devices to process large volumes of data. For example, the client access agent 160 can leverage countless client devices to process data for complex computer-based models.

In another example, the client access agent 160 can communicate to the client device 115 a survey to be completed by the user. The client device 115 can present the survey via a user interface, and receive user inputs responsive to questions asked in the survey. The sharing agent 145 can communicate corresponding data as shared device resources 165 to the client access agent 160. Accordingly, the client access agent 160 can perform surveys in a very efficient manner. It should be noted that merely presenting the survey to a user per se is not sharing device resources 135 but, in the context of the arrangements described herein, communicating the data corresponding to the user inputs from the client device 115 to the client access agent 160 is sharing of the device resources 135.

In another example, the client access agent 160 can communicate to the client device 115 an advertisement to be presented to the user. The client device 115 can present the advertisement via a user interface, and receive user inputs responsive to the advertisement. For example, the user can be prompted to indicate whether the user would like additional information on products, services or the like presented in the advertisement, whether the user likes the advertisement, and the like. The sharing agent 145 can communicate corresponding data as shared device resources 165 to the client access agent 160. Accordingly, the client access agent 160 can collect user responses to advertisements in a very efficient manner. It should be noted that merely presenting the advertisement to a user per se is not sharing device resources 135. As noted, though, in the context of the arrangements described herein, communicating the data corresponding to the user inputs from the client device 115 to the client access agent 160 is sharing of the device resources 135.

In yet another example, the client access agent 155 (or client access agent 160) can request from the sharing agent 145 statistical data related to the client device 115 that is typically is not automatically provided by the client device 115 to network providers or other entities during the course of using network resources. The sharing agent 145 can communicate corresponding data as shared device resources 165 to the client access agent 155 and/or communicate corresponding data as shared device resources 170 to the client access agent 160. Examples of such information include, but are not limited to, data related to a user's use of the client device 115, data related to software installed on the client device 115, data related to specific types of hardware of the client device 115, data levels of use of hardware/software resources of the client device 115, and the like. The client access agent 155 (or client access agent 160) can accumulate such data from a significant number of client devices to and track such data in a database. In this regard, the data can include statistical and/or historical data, though the present arrangements are not limited in this regard.

The data can be used for any of a variety of purposes, for example to target advertisements to users of client devices, determine when upgrades to the communication network 110 and/or websites should be implemented to keep up with new client device hardware/software trends, etc. In illustration, if the other entity 140 is a developer of computer games, and shared device resources 170 indicate a trend of client devices moving to more powerful processors (e.g., central processing units, graphics processing units, etc.), larger amounts of RAM, larger amounts of bulk storage, etc., the developer can program games to take advantage of the trend and provide more immersive gaming experiences.

Nonetheless, the sharing application 125 can store and monitor request for, and collection of, the shared device resources 170 by the client access agent 160 to ensure that access to the shared device resources 170 by the other entity 140 comply with certain requirements, such as contractual obligations, privacy expectations, etc. For example, the sharing application 125 can monitor resource usage requests generated by the client access agent 160 and communicated to the client device 115, monitor content of the shared device resources 170, and the like. If such requests or the content of the shared device resources 170 are deemed to be in violation of the certain requirements, the sharing application 125 can implement necessary procedures to cease sharing of the device resources 170 by the client device 115. For example, the sharing application 125 can communicate a message to the sharing agent 145 to cease such sharing and/or communicate a message to the client access agent 160 to cease requests/collection of the shared device resources 170.

At this point it should be noted that the network provider 105 can collect data contained in the shared device resources 165 and provide such data to other entities (e.g., the entity 140) in exchange for financial compensation, or any other form of compensation. Similarly, the network provider 105 can enable, via the sharing application 125, sharing of the device resources 135 directly with the other entity 140, as the shared device resources 170, in exchange for financial compensation, or any other form of compensation. Accordingly, while the network provider 105 may incur added costs in order to provide the additional network resources 130 to the client device, rather than charging the user of the client device 115 a fee for such additional network resources 130, the network provider 105 can derive compensation from the other entity 140. Such an arrangement can benefit not only the network provider 105, but also benefit the user of the client device 115 and the other entity 140.

Figure 2:
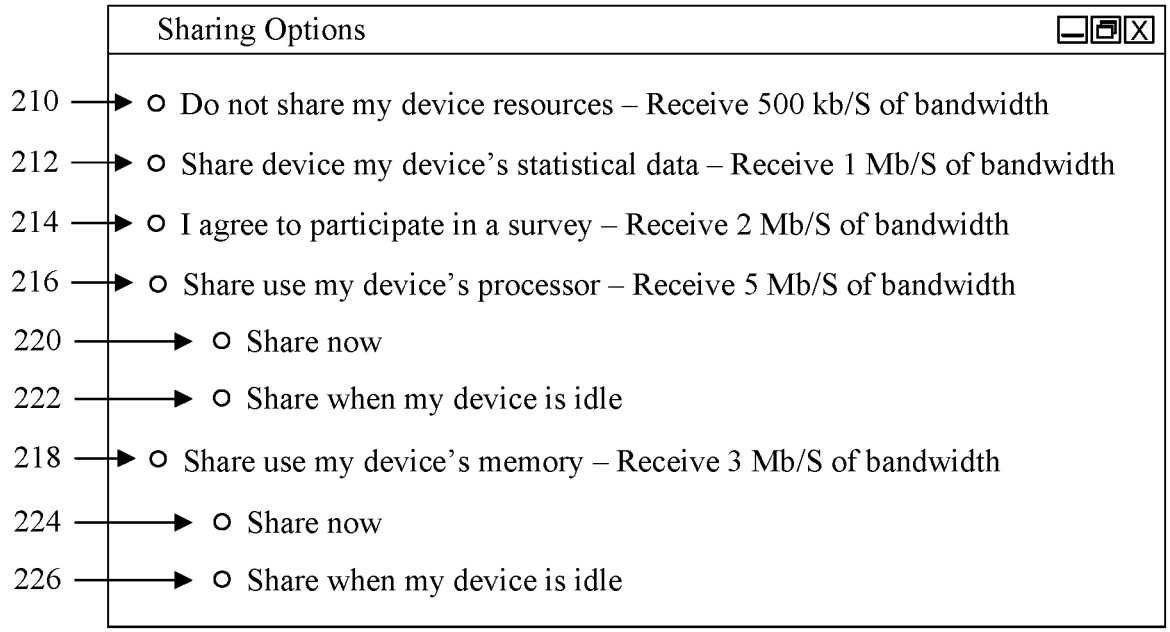
FIG. 2 is an example view of a menu of client device sharing options.

FIG. 2 is an example view of a menu 200 of client device sharing options. Referring to FIGS. 1 and 2, the menu 200 can be received by the sharing agent 145 from the sharing application 125, and presented by the client device 115 to a user. For example, the menu 200 can be presented on a display integrated with, or otherwise attached to, the client device 115. In one aspect, the menu 200 can be presented to a user in response to the client device 115 accessing a communication network 110 that is not the client device's primary network. For example, the menu 200 can be presented when the client device 115 accesses a communication network 110 in a public establishment, such as a cafe, restaurant, library, hotel, airport, arena, stadium or the like.

In another aspect, the menu 200 can be presented to the user, even if the client device 115 is accessing the client device's primary network. A user can choose to share devices resources 135 of the client device 115, at least temporarily, in exchange for receiving a higher level of network resources 130 beyond that which otherwise is provided by the primary network to the client device 115. In illustration, a user may subscribe to a first tier of network resources 130. At some point in time, the user may desire a temporary escalation of the level network resources 130. The user can access the menu 200 and agree to share resources of the client device 115 in exchange for receiving a corresponding escalation of network resources 130. In one example, if the user connects to the communication network 110 via a particular LAN, for example a LAN in the home or place of work of the user, the escalation of network resources 130 can be provided to a modem or transceiver of the LAN that is used to access the communication network 110. In such case, other devices on the LAN also may benefit from the escalation of network resources 130. Nonetheless, the present arrangements are not limited in this regard and the escalation of network resources 130 can be specific to a particular client device 115. The network provider 105 can distinguish the client device 115 from other client devices in the LAN based on a particular IP address assigned to the client device 115 in the LAN's subnet, a particular MAC address of the client device 115, or in any other suitable manner.

The menu 200 can include a plurality of menu items 210, 212, 216, 218. The menu items 210-218 can be configured to be user selectable, for example using selectable radio buttons, selectable icons, selectable controls, a drop down menu, or the like. Responsive to a user selecting one or more of the menu items 210-218, messages can be exchanged among the sharing application 125, sharing agent 145, client access agent 155 and/or client access agent 160, as appropriate. At least one of the messages exchanged can be a message from the sharing agent 145 to the sharing application 125 comprising an indicator indicating the selection of one or more of the menu items 210-218 by the user. Messages received by the sharing application 125 can be processed to determine a corresponding level of network resources 130 that is to be provided to the client device 115 based on a level of device resources 135 being shared by the client device 115. The network provider 105 can provide such network resources 130 accordingly.

The menu item 210 can indicate an option selectable by the user not to share the device resources 135 of the client device 115. The menu item 210 also can indicate a level of network resources 130 that are available to the client device 115 should the user select the menu item 210. In illustration, the menu item 210 can indicate a base level of network resources 130. Responsive to the user selecting the menu item 210, the sharing agent 145 can communicate the user's selection to the sharing application 125, and the network provider 105 can provide to the client device 115 the base level of network resources 130 indicted in the menu item 210.

Each menu item 212-218 can indicate a particular level of device resources 135 of the client device 115 and a corresponding level of network resources 130 to be provided to the client device 115 in exchange for the client device 115 sharing a particular level of the device resources 135. For example, the menu item 212 can indicate an option to share device resources 135 comprising statistical data associated with the client device 115, such as a user's use of the client device 115, a user's use of particular software on the client device 115, levels of processing resources, RAM, bulk storage and/or network bandwidth used by the client device 115 over one or more periods, and the like. The menu item 212 also can indicate the level of network resources 130 to be provided to the client device 115 if the user selects the menu item 212. Responsive to the user selecting the menu item 212, the sharing agent 145 can automatically communicate the statistical data to the client access agent 155 and/or client access agent 160 and, in response, the network provider 105 can provide to the client device 115 the corresponding level of network resources 130 indicated in the menu item 212.

The menu item 214 can indicate an option for the user to participate in a survey and a corresponding level of network resources 130 to be provided to the client device 115 if the user participates in the survey. For example, responsive to the user selecting the menu item 214, the sharing application 125, client access agent 155 or client access agent 160 can communicate to the sharing agent 145 a survey, which the client device 115 can present to the user via the user interface. Responsive to the user completing the survey, data corresponding to the user's answers to the survey can be communicated by the sharing agent 145 to the client access agent 155 and/or client access agent 160, and the corresponding level of network resources 130 indicated in the menu item 214 can be provided to the client device 115.

The menu item 216 can indicate an option for the user to share use of the processor of the client device 115 and a corresponding level of network resources 130 to be provided to the client device 115 if the user chooses to share use of the processor. In one aspect, the menu 200 further can include menu items 220, 222 selectable by the user to indicate whether the user chooses to immediately share use of the processor or share use of the processor when the client device 115 is idle (i.e., not being used by the user). Responsive to the user selecting the menu item 216 and, optionally, the menu item 220 or the menu item 222, data corresponding to the user's selection can be communicated by the sharing agent 145 to the sharing application 125, and the network provider 105 can provide to the client device 115 the level of network resources 130 corresponding to the menu item 216.

The sharing application 125 also can select one or more client access agents, such as the client access agent 155 and/or the client access agent 160, to utilize the device resources 135 being shared. Further, the sharing application 125 can communicate one or more messages to such client access agent(s) 155, 160 that include data to be used to access the shared device resources 135. The client access agents 155, 160 can process such data to interface with the sharing agent 145 and access the shared device resources 165,170.

The menu item 218 can indicate an option for the user to share use of the memory (e.g., RAM and/or bulk storage) of the client device 115, and a corresponding level of network resources 130 to be provided to the client device 115 if the user chooses to share use of the memory. Again, the menu 200 further can include menu items 224, 226 selectable by the user to indicate whether the user chooses to immediately share use of the memory, or share use of the memory when the client device 115 is idle. Such device resources 135 can be shared as previously described.

In another example, the level of device resources 135 need not be limited to the number and/or particular types of device resources 135 being shared, but also can be based on a use portion of such device resources 135, for example a percentage of usage. In illustration, the menu item 216 may specify a first percentage of use of processing resources (e.g., 25%), and the second menu item 218 may specify a second percentage of use of processing resources (e.g., 50%). In such case, the menu item 218 may, but need not, indicate and/or require the use of the storage on the client device 115. In this regard, each of the menu items 214, 216 may specify a particular percentage of use of a particular device resource 135, and indicate a particular level of network resources 130 corresponding to that percentage of use of the particular device resource 135.

In the case that the user selects to immediately share use of the device resources 135, the sharing application 125 can initiate usage the use of the device resources 135 according to the user selection(s), for example by communicating corresponding requests to the sharing agent 145. In the case that the user selects to share use of the device resources 135 when the client device 115 is idle, the sharing application 125 can schedule use of such device resources 135 to occur when the client device is idle. For example, the sharing application 125 can communicate requests to the sharing agent 145 to monitor user inputs provided to the client device 115 and information being presented to the user via the user interface of the client device 115. Responsive to the sharing agent 145 detecting that no user inputs are received over a particular duration of time and detecting that video content is not being streamed to the client device 115 over a particular duration of time, the sharing agent 145 can determine that the client device 115 is idle and communicate one or more corresponding messages to the sharing application 125. Such messages can be processed by the sharing application 125 to indicate usage of the shared device resources 135 by the client access agent 155 and/or client access agent 160. In another arrangement, the sharing application 125 can use of such device resources 135 to occur when such device resources 135 are lightly loaded, for example when a user is using the client device 115 to browse the Internet or the user is interacting with an e-mail client.

In one aspect, the sharing agent 145 can, when use of the device resources 135 is being shared, prevent the client device 115 from entering a sleep mode. In another aspect, the sharing agent 145 can, when use of the device resources 135 is being shared, only allow the client device 115 to enter sleep mode after a particular duration of time in which use of the device resources 135 has been shared and/or enter sleep mode when a charge level of a battery providing power to the client device 115 falls below a threshold level.

In one arrangement, a user can select multiple ones of the menu items 212-218 that are not redundant or adverse. When the user selects two or more of the menu items 212-218, the menu 200 can be updated to present a particular level of network resources 130 that corresponds to multiple selections. Continuing with the preceding examples, a user can select two or more of the menu items 212, 214, 216 and 218. In the case that the user selects two or more of the menu items 212-218, a level network resources 130 indicated by the menu 200 can greater than a level of resources corresponding to any one of the individual menu items 212-218 that are selected. For example, a new window can be presented in the menu 200 or the selected menu items can be updated to reflect the new level of network resources 130. The new level of network resources 130 can be a summation of the network resources 130 indicated by the selected menu items 212-218, though this need not be the case.

The menu 200 presents examples of device resources 135 that can be shared and network resources 130 that can be provided/escalated in exchange for use of the device resources 135. The present arrangements, however, are not limited to these examples. Indeed, other device resources 135 can be shared by a client device 115 and other types of network resources 130 can be provided and/or escalated.

Figure 3:
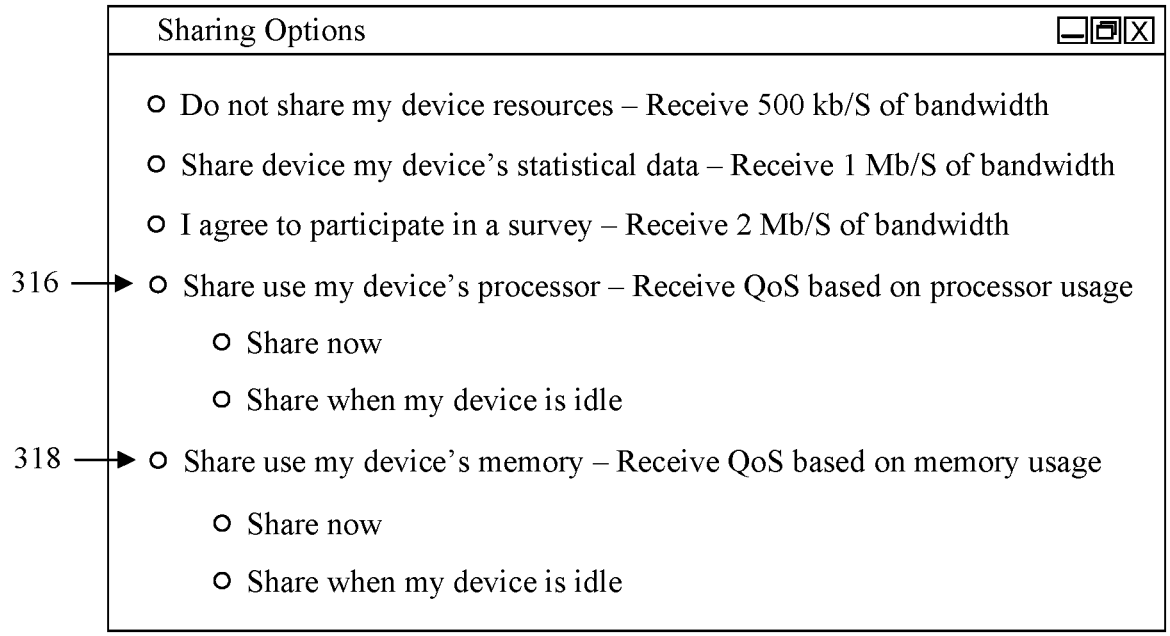
FIG. 3 is another example view of a menu of client device sharing options.

FIG. 3 is another example view of a menu 300 of client device sharing options. The menu 300 can be similar to the menu 200 of FIG. 2. In this example, the level of network resources 130 provided to the client device 115 can be based not only on which device resources 135 are actually being shared, but also on the productivity generated by sharing of such device resources 135. Generally speaking, a client device having high performance hardware will be able to process data much more efficiently than a client device having hardware that is average or subpar in performance. Thus, rather than providing a particular level of network resources 130 based on whether certain device resources 135 are being shared, or a percentage of use of such device resources 135 are being shared, the level of network resources 130 provided to the client device 115 can be based on the ability of the client device 115 to process data as requested by the client access agent 155 and/or client access agent 160.

In illustration, a user can be presented a menu item 316 which is selectable by the user to share use of the client device's processor. In response to the user selecting the menu item 316, the sharing agent 145 can share use of the processor with the client access agent 155 and/or client access agent 160. The sharing application 125 can monitor the level of usage of the processor by the client access agent 155 and/or client access agent 160. For instance, the sharing application 125 can monitors number of problems solved or a number of calculations performed by the processor of the client device 115 to process data provided by the client access agent 155 and/or client access agent 160. In another example, the sharing application can monitor a number of floating-point operations (FLOPs) used to process the data. Still, any other performance metric can be used to monitor the performance of the processor at processing the provided data and the present arrangements are not limited in this regard. Regardless of the type of performance metric that is monitored, based on the level of performance of the processor at processing data as requested by the client access agent 155 and/or client access agent 160, the sharing application 125 can determine a level of network resources 130 to provide to the client device 115, and the network provider 105 can provide that level of network resources 130. As the sharing application 125 continues to monitor results of the performance of the client device 115 at processing provided data, the sharing application 125 can adjust the level of network resources 130 provided to the client device 115.

Similarly, a user can be presented a menu item 318 which is selectable by the user to share use of the memory of the client device 115. In response to the user selecting the menu item 318, the sharing agent 145 can share use the client device's memory with the client access agent 155 and/or client access agent 160. The sharing application 125 can monitor performance of the memory based on the volume of data stored and/or based on rates of data transfer to/from the memory. Again, the sharing application 125 can adjust the level of network resources 130 provided to the client device 115 based on the performance of the memory with respect to storing data provided by the client access agent 155 and/or client access agent 160.

Figure 4:
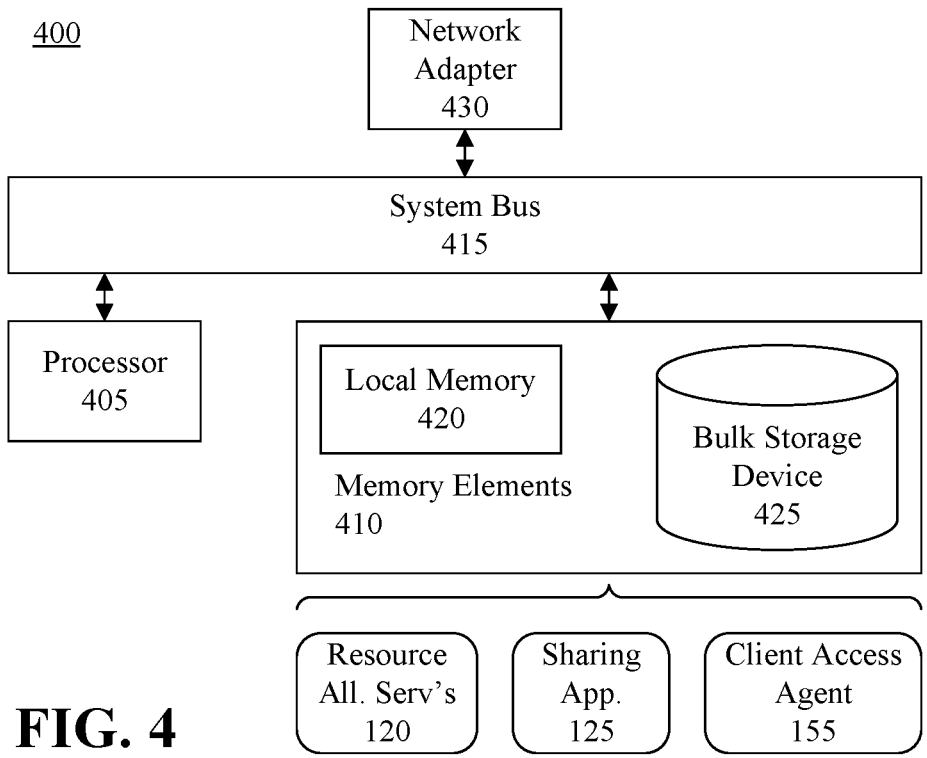
FIG. 4 is a block diagram illustrating example architecture for a network provider.

FIG. 4 is a block diagram illustrating example architecture for a processing system 400 of the network provider 105 of FIG. 1. The processing system 400 can include at least one processor 405 (e.g., a central processing unit) coupled to memory elements 410 through a system bus 415 or other suitable circuitry. As such, the processing system 400 can store program code within the memory elements 410. The processor 405 can execute the program code accessed from the memory elements 410 via the system bus 415. It should be appreciated that the processing system 400 can be implemented in the form of any system including a processor and memory that is capable of performing the functions and/or operations described within this specification. For example, the processing system 400 can be implemented as a server.

The memory elements 410 can include one or more physical memory devices such as, for example, local memory 420 and one or more bulk storage devices 425. Local memory 420 refers to RAM or other non-persistent memory device(s) generally used during actual execution of the program code. The bulk storage device(s) 425 can be implemented as a hard disk drive (HDD), solid state drive (SSD), or other persistent data storage device. The processing system 400 also can include one or more cache memories (not shown) that provide temporary storage of at least some program code in order to reduce the number of times program code must be retrieved from the bulk storage device 425 during execution.

Input/output (I/O) devices such as one or more network adapters 430 can be coupled to the processing system 400 either directly or through intervening I/O controllers. The network adapter(s) 430 enable the processing system 400 to become coupled to other systems, computer systems, remote printers, and/or remote storage devices through intervening private or public networks. Modems, cable modems, transceivers, and Ethernet cards are examples of different types of network adapters 430 that can be used with the processing system 400.

As pictured in FIG. 4, the memory elements 410 can store the components of the network provider 105 of FIG. 1, namely the resource allocation services 120, the sharing application 125 and the client access agent 155. Being implemented in the form of executable program code, these components of the network provider 105 can be executed by the processing system 400 and, as such, can be considered part of the processing system 400. Moreover, the resource allocation services 120, the sharing application 125 and the client access agent 155 are functional data structures that impart functionality when employed as part of the processing system 400 of FIG. 4.

Figure 5:
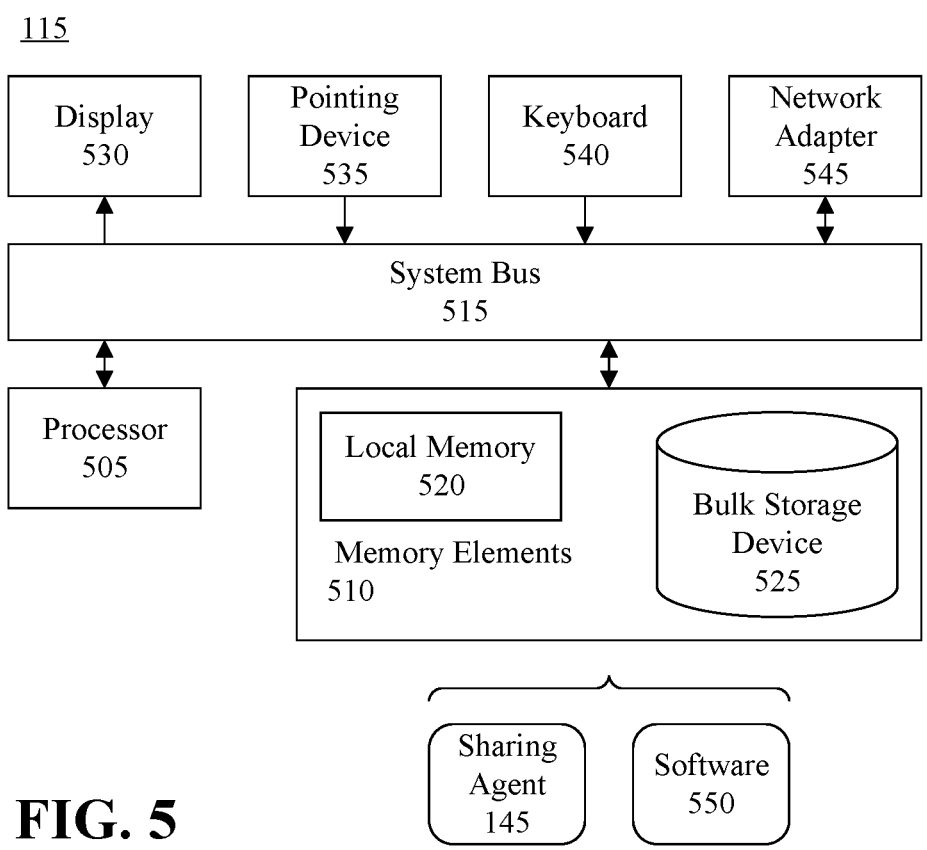
FIG. 5 is a block diagram illustrating example architecture for a client device.

FIG. 5 is a block diagram illustrating example architecture for the client device 115 of a FIG. 1. The client device 115 can include at least one processor 505 (e.g., a central processing unit) coupled to memory elements 510 through a system bus 515 or other suitable circuitry. As such, the client device 115 can store program code within the memory elements 510. The processor 505 can execute the program code accessed from the memory elements 510 via the system bus 515. It should be appreciated that the client device 115 can be implemented in the form of any system including a processor and memory that is capable of performing the functions and/or operations described within this specification.

The memory elements 510 can include one or more physical memory devices such as, for example, local memory 520 and one or more bulk storage devices 525. Local memory 520 refers to RAM or other non-persistent memory device(s) generally used during actual execution of the program code. The bulk storage device(s) 525 can be implemented as a HDD, SSD, or other persistent data storage device. The client device 115 also can include one or more cache memories (not shown) that provide temporary storage of at least some program code in order to reduce the number of times program code must be retrieved from the bulk storage device 525 during execution.

Input/output (I/O) devices such as a display 530, a pointing device 535 and, optionally, a keyboard 540 can be coupled to the client device 115. The I/O devices can be coupled to the client device 115 either directly or through intervening I/O controllers. For example, the display 530 can be coupled to the client device 115 via a graphics processing unit (GPU), which may be a component of the processor 505 or a discrete device. One or more network adapters 545 also can be coupled to client device 115 to enable client device 115 to become coupled to other systems, computer systems, remote printers, and/or remote storage devices through intervening private or public networks. Modems, cable modems, transceivers, and Ethernet cards are examples of different types of network adapters 545 that can be used with the client device 115.

As pictured in FIG. 5, the memory elements 510 can store the sharing agent 145 of FIG. 1. The memory elements also can store other software executed by the client device 115. Being implemented in the form of executable program code, these components can be executed by the client device 115 and, as such, can be considered part of the client device 115. Moreover, the sharing agent 145 and software 550 are functional data structures that impart functionality when employed as part of the client device 115 of FIG. 5.

FIG. 6 is a flow chart illustrating an example of a method 600 of increasing a communication network resource provided to a client device. At step 605, an indicator can be received from a client device. The indicator can indicate an agreement by a user of the client device to share device resources of the client device with an entity distinct from the client device and distinct form the user of the client device. At step 610, responsive to receiving from the client device the indicator indicating the agreement of the user of the of the client device to share the device resources of the client device with the entity, at least one network resource provided to the client device can be increased using a processor.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

communicating to a mobile device a menu of client device sharing options, the menu comprising a plurality of menu items each indicating a particular level of device resources of the mobile device and a corresponding level of network resources to be provided to the mobile device in exchange for the mobile device sharing the particular level of the device resources;

receiving from the mobile device an indicator, the indicator indicating an agreement by a user of the mobile device to share device resources of the mobile device with an entity distinct from the mobile device and distinct from the user of the mobile device, and a selection, by the user of the mobile device, of at least one of the menu items; and responsive to receiving from the mobile device the indicator indicating the agreement of the user of the of the mobile device to share the device resources of the mobile device with the entity and responsive to receiving a message from a sharing agent of the mobile device indicating that that no user inputs are received by the mobile device over a particular duration of time and that video content is not being streamed to the mobile device, accessing, by a client access agent executed by a first processor, the shared device resources, communicating to the mobile device data to be processed by the shared device resources of the mobile device, the shared device resources processing the data, and increasing a level of quality of service provided by the communication network to the mobile device to be higher than a present level of quality of service being provided to the mobile device.

2. The method of claim 1, further comprising:

monitoring performance of a second processor at processing data provided by the entity to the mobile device, wherein the second processor is a component of the mobile device; and based on the performance of the second processor at processing data provided by the entity to the mobile device, adjusting a level of the at least one additional network resource provided by a network provider to the mobile device.

3. The method of claim 1, further comprising:

monitoring performance of a second processor at processing data provided by the entity to the mobile device, wherein the second processor is a component of the mobile device; and based on the performance of the second processor at processing data provided by the entity to the mobile device, adjusting the quality of service being provided to the mobile device.

4. The method of claim 3, wherein:

the monitoring the performance of the second processor at processing the data provided by the entity to the mobile device comprises monitoring a number of problems solved by the second processor to process the data communicated to the mobile device; and the adjusting the quality of service being provided to the mobile device is further based on the number of problems solved by the second processor to process the data communicated to the mobile device.

5. The method of claim 3, wherein:

the monitoring the performance of the second processor at processing the data provided by the entity to the mobile device comprises monitoring a performance of memory of the mobile device at storing data provided by the entity to the mobile device; and the adjusting the quality of service being provided to the mobile device is further based on monitoring the performance of the memory of the mobile device at storing the data provided by the entity to the mobile device.

6. The method of claim 5, wherein monitoring the performance of the memory of the mobile device at storing the data provided by the entity to the mobile device comprises:

monitoring a transfer rate of the data to or from the memory.

7. The method of claim 1, further comprising:

responsive to receiving from the mobile device the indicator indicating the selection by the user of the mobile device of at least one of the plurality of menu items, initiating usage of the particular level of the device resources shared by the mobile device.

8. A system, comprising:

a first processor programmed to initiate executable operations comprising: communicating to a mobile device a menu of client device sharing options, the menu comprising a plurality of menu items each indicating a particular level of device resources of the mobile device and a corresponding level of network resources to be provided to the mobile device in exchange for the mobile device sharing the particular level of the device resources;

receiving from the mobile device an indicator, the indicator indicating an agreement by a user of the mobile device to share device resources of the mobile device with an entity distinct from the mobile device and distinct from the user of the mobile device, and a selection, by the user of the mobile device, of at least one of the menu items; and responsive to receiving from the mobile device the indicator indicating the agreement of the user of the of the mobile device to share the device resources of the mobile device with the entity and responsive to receiving a message from a sharing agent of the mobile device indicating that that no user inputs are received by the mobile device over a particular duration of time and that video content is not being streamed to the mobile device, accessing, by a client access agent executed by the first processor, the shared device resources, communicating to the mobile device data to be processed by the shared device resources of the mobile device, the shared device resources processing the data, and increasing a level of quality of service provided by the communication network to the mobile device to be higher than a present level of quality of service being provided to the mobile device.

9. The system of claim 8, the executable operations further comprising:

monitoring performance of a second processor at processing data provided by the entity to the mobile device, wherein the second processor is a component of the mobile device; and based on the performance of the second processor at processing data provided by the entity to the mobile device, adjusting a level of the at least one additional network resource provided by a network provider to the mobile device.

10. The system of claim 8, the executable operations further comprising:

monitoring performance of a second processor at processing data provided by the entity to the mobile device, wherein the second processor is a component of the mobile device; and based on the performance of the second processor at processing data provided by the entity to the mobile device, adjusting the quality of service being provided to the mobile device.

11. The system of claim 10, wherein:

the monitoring the performance of the second processor at processing the data provided by the entity to the mobile device comprises monitoring a number of problems solved by the second processor to process the data communicated to the mobile device; and the adjusting the quality of service being provided to the mobile device is further based on the number of problems solved by the second processor to process the data communicated to the mobile device.

12. The system of claim 10, wherein:

the monitoring the performance of the second processor at processing the data provided by the entity to the mobile device comprises monitoring a performance of memory of the mobile device at storing data provided by the entity to the mobile device; and the adjusting the quality of service being provided to the mobile device is further based on monitoring the performance of the memory of the mobile device at storing the data provided by the entity to the mobile device.

13. The system of claim 12, wherein monitoring the performance of the memory of the mobile device at storing the data provided by the entity to the mobile device comprises:

monitoring a transfer rate of the data to or from the memory.

14. The system of claim 8, the executable operations further comprising:

responsive to receiving from the mobile device the indicator indicating the selection by the user of the mobile device of at least one of the plurality of menu items, initiating usage of the particular level of the device resources shared by the mobile device.

15. A computer program product comprising a computer readable storage medium having program code stored thereon, the program code executable by a first processor to perform a method comprising:

communicating to a mobile device a menu of client device sharing options, the menu comprising a plurality of menu items each indicating a particular level of device resources of the mobile device and a corresponding level of network resources to be provided to the mobile device in exchange for the mobile device sharing the particular level of the device resources;

receiving from the mobile device an indicator, the indicator indicating an agreement by a user of the mobile device to share device resources of the mobile device with an entity distinct from the mobile device and distinct from the user of the mobile device, and a selection, by the user of the mobile device, of at least one of the menu items; and responsive to receiving from the mobile device the indicator indicating the agreement of the user of the of the mobile device to share the device resources of the mobile device with the entity and responsive to receiving a message from a sharing agent of the mobile device indicating that that no user inputs are received by the mobile device over a particular duration of time and that video content is not being streamed to the mobile device, accessing, by a client access agent executed by the first processor, the shared device resources, communicating to the mobile device data to be processed by the shared device resources of the mobile device, the shared device resources processing the data, and increasing a level of quality of service provided by the communication network to the mobile device to be higher than a present level of quality of service being provided to the mobile device.

16. The computer program product of claim 15, the method further comprising:

monitoring performance of a second processor at processing data provided by the entity to the mobile device, wherein the second processor is a component of the mobile device; and based on the performance of the second processor at processing data provided by the entity to the mobile device, adjusting a level of the at least one additional network resource provided by a network provider to the mobile device.

17. The computer program product of claim 15, the method further comprising:

monitoring performance of a second processor at processing data provided by the entity to the mobile device, wherein the second processor is a component of the mobile device; and based on the performance of the second processor at processing data provided by the entity to the mobile device, adjusting the quality of service being provided to the mobile device.

18. The computer program product of claim 17, wherein:

the monitoring the performance of the second processor at processing the data provided by the entity to the mobile device comprises monitoring a number of problems solved by the second processor to process the data communicated to the mobile device; and the adjusting the quality of service being provided to the mobile device is further based on the number of problems solved by the second processor to process the data communicated to the mobile device.

19. The computer program product of claim 17, wherein:

the monitoring the performance of the second processor at processing the data provided by the entity to the mobile device comprises monitoring a performance of memory of the mobile device at storing data provided by the entity to the mobile device; and the adjusting the quality of service being provided to the mobile device is further based on monitoring the performance of the memory of the mobile device at storing the data provided by the entity to the mobile device.

20. The computer program product of claim 19, wherein monitoring the performance of the memory of the mobile device at storing the data provided by the entity to the mobile device comprises:

monitoring a transfer rate of the data to or from the memory.

* * * * *